United States Patent
Perschk

(10) Patent No.: US 12,524,603 B2
(45) Date of Patent: Jan. 13, 2026

(54) METHODS FOR RECOGNIZING AND INTERPRETING GRAPHIC ELEMENTS

(71) Applicant: Patty's GmbH, Hamburg (DE)

(72) Inventor: Andreas Perschk, Hamburg (DE)

(73) Assignee: Patty's GmbH, Hamburg (DE)

( * ) Notice: Subject to any disclaimer, the term of this patent is extended or adjusted under 35 U.S.C. 154(b) by 0 days.

(21) Appl. No.: 18/609,638

(22) Filed: Mar. 19, 2024

(65) Prior Publication Data
US 2024/0232510 A1     Jul. 11, 2024

Related U.S. Application Data

(63) Continuation of application No. 16/727,021, filed on Dec. 26, 2019, now Pat. No. 11,941,343.

(51) Int. Cl.
*G06F 40/14* (2020.01)
*G06F 3/0481* (2022.01)

(52) U.S. Cl.
CPC ............ *G06F 40/14* (2020.01); *G06F 3/0481* (2013.01)

(58) Field of Classification Search
CPC ................................ G06F 40/14; G06F 3/0481
See application file for complete search history.

(56) References Cited

U.S. PATENT DOCUMENTS

| | | | |
|---|---|---|---|
| 10,474,919 B2 | 11/2019 | Perschk | |
| 2004/0268299 A1 | 12/2004 | Lei et al. | |
| 2011/0023017 A1 | 1/2011 | Calvin | |
| 2017/0024792 A1* | 1/2017 | Perschk | G06Q 30/0625 |
| 2017/0270215 A1 | 9/2017 | Mealey | |
| 2017/0300768 A1* | 10/2017 | Perschk | G06Q 30/0253 |
| 2020/0150935 A1 | 5/2020 | Bucur et al. | |

OTHER PUBLICATIONS

Infragistics, "Design and Build Real Apps Blazing Fast," https://www.infragistics.com/products/appbuilder?utm_source=google&utm_medium=cpc&utm_campaign=appbuilder&utm_term=search-designtocode-germany&gad_source=1&gclid=CjwKCAjwzN-vBhAkEiwAYiO7oOx2vX2TZPm_h6Z_5LFY1v1sYSh3utulZoNakcajQcHJcWue0izALhoCFjwQAvD_BwE, date not available, 8 pages.

Heise Online, "Machine Learning: Microsoft's Sketch2Code generates HTML code from drawings," https://www.heise.de/news/Machine-Learning-Microsofts-Sketch2Code-erzeugt-HTML-Code-aus-Zeichnungen-4146813.html, Aug. 28, 2018, 12 pages.

* cited by examiner

*Primary Examiner* — Sherrod L Keaton
(74) *Attorney, Agent, or Firm* — Slater Matsil, LLP

(57) ABSTRACT

In an embodiment a method for creating a website includes creating a website comprising at least one image displayable in a graphical user interface of a display of a processing device, wherein the at least one image is otherwise without any programmed function related to a visual image content of the at least one image and integrating code with the website, wherein the code is able to transmit a selectable visual image content of the at least one image to an evaluation unit of a data processing system such that, when the at least one image is displayed in the graphical user interface on a data processing device and an area of the at least one image is selected by an operating pointer of the data processing device, the selected visual image content of the area surrounding the operating pointer is transmitted to the evaluation unit.

19 Claims, 1 Drawing Sheet

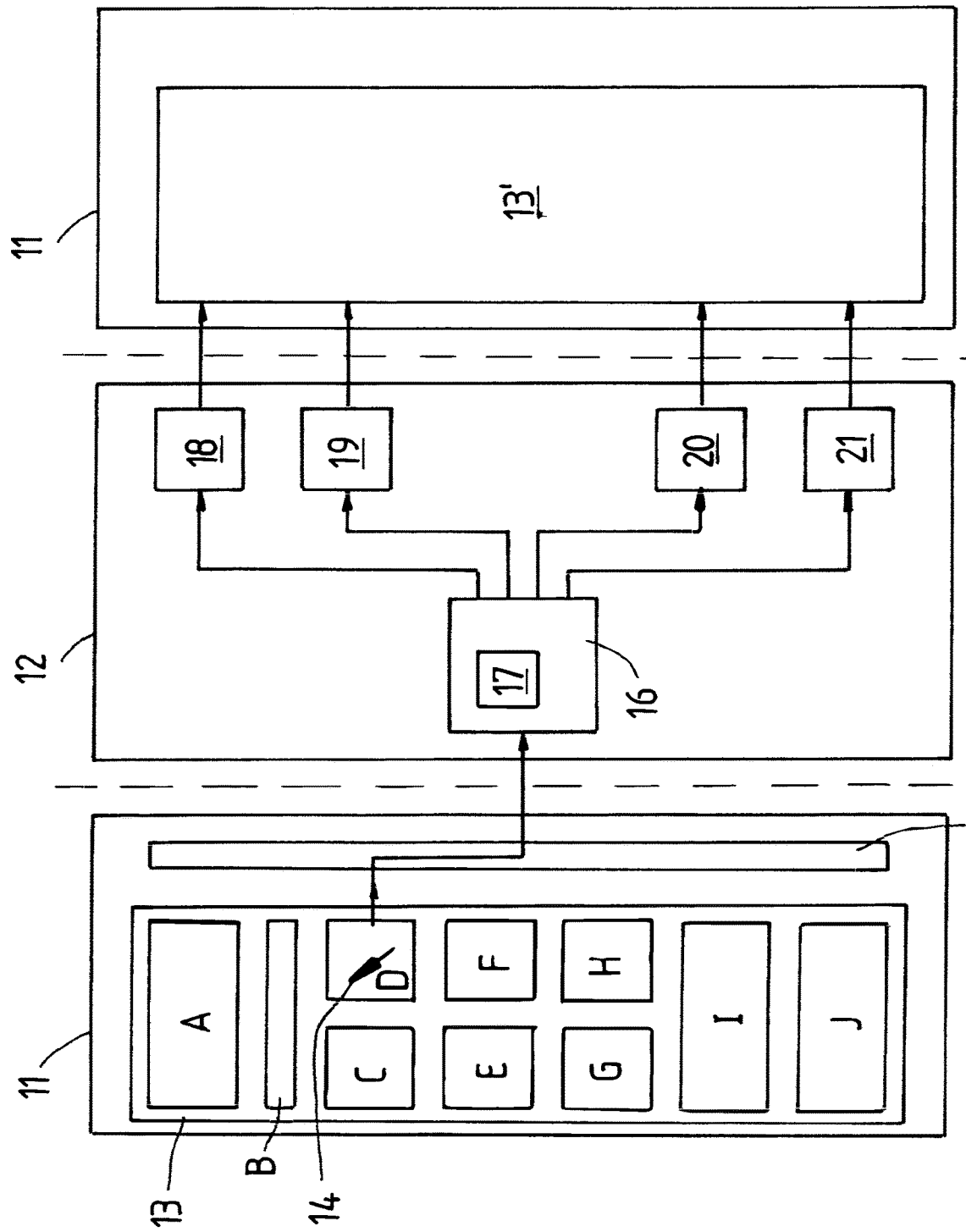

METHODS FOR RECOGNIZING AND INTERPRETING GRAPHIC ELEMENTS

CROSS-REFERENCE TO RELATED APPLICATIONS

This application is a continuation application of U.S. application Ser. No. 16/727,021, filed on Dec. 26, 2019, which application is hereby incorporated herein by reference.

TECHNICAL FIELD

The invention relates to a method for recognizing and interpreting graphic or visual elements in order to create a website with input options, and operate it by a data processing device, by means of which input a determinable action, a determinable representation, or a determinable process is triggered, which website has a graphical user interface which shows at least one image and/or at least one text field and/or at least one input field which can be selected via an operating pointer of the data processing device.

BACKGROUND

It is known that goods, services or any other actions or processes are displayed and offered on data processing devices. The displayed goods, services, actions, or processes are referred to below as products, without any restriction.

The data processing device can be a computer, a notebook, a tablet computer, VR goggles, display goggles, a touch screen display or a mobile telephone with a corresponding configuration—a so-called smart phone. What these devices have in common is that they are connected to or can be connected to the World Wide Web/the Internet. Such a data processing device further comprises a display device on which the accessed websites can be displayed.

The websites are subject to certain standards in order to allow for uniform operation or presentation. Symbols with generally applicable meanings are known. The user expects certain reactions when selecting these with his operating pointer, and the operation of such a website is intuitive and easy for the user as a result. The internet is often used to find specific offers or providers. Known search engines for this practice search the internet for specific terms or images using the data processing system, and display the results on the display device of the data processing device of the user.

The user of such a data processing device selects a specific product with the operating pointer on a website he accesses, and sees the result generated by the product displayed on the display device. The operating pointer can be the mouse arrow or the finger or the stylus of the user, in the case of a touch screen, or it can also be embodied by the focusing of the user's eye. The display device thus forms an interactive user interface with which the user inputs his selection or commands.

Websites are to be understood as presentations on the internet, such as mobile websites, virtual presentations, blogs, newsletters on imaging displays, such as VR goggles. The websites provide and display a designed and interactive user interface on the graphical user interface.

Purchase contracts are also often concluded over the internet. For this purpose, various products are displayed in an online shop on its website, and these can be selected and specified in more detail, then purchased. The user selects a product based on an image. By selecting this image by means of the operating pointer on the display device, the link to the seller is generated and set up so that the user can buy the goods in question. The operator of the online shop therefore does not necessarily have to be in possession of the selected goods, but merely establish the connection to the seller. For this, the operator of the online shop receives a commission from the seller of the goods—in a so-called affiliation.

The website of an online shop includes a graphical user interface on which several images of products are displayed. The products can be, for example, specific goods or services or symbolize a group of products. After selecting one of the images with the operating pointer of his data processing device, the user expects a certain action.

If, for example, a large number of similar items are displayed on the website on the graphical user interface, the user selects one of the items, for example by clicking on the mouse, and expects further information about this item in response, for example its price and its seller. If several different types of objects are shown on the graphical user interface, the user expects, following the selection, a display of several specific objects of this type, which are symbolized by the displayed image. Then he can select one of the specific objects, for example to purchase it.

In order for this functionality to be fulfilled, it is necessary to link the area of the graphical user interface on which the picture in question is shown with a link that provides a connection to the website of the provider or a search engine that uses the title of the item shown as a search term. A method for creating an online shop using a similarity analysis is known, for example, from DE 10 2015 112 168 A1. The construction and design of such an online shop are accordingly complex, since at least one link must be generated for each representation, so that the goods shown can be displayed, or the process displayed can be initiated and carried out.

Nowadays, a user interface is usually implemented in web design with the help of so-called templates, which have ready-made design elements that are suitable for showing the consumer an appealing offer or clear information. At the same time, the logical links to processes, products and information should be able to be established. The designer selects suitable templates for this and further implements the customer's specific requirements.

In this design process, a step follows in which templates are linked to the products, information and processes via link structures. For this it is necessary to create specific link structures, for example to integrate the user interface in shop software or to provide design elements such as search lines, buttons, category names or filters with a stored programmed function. This is relatively complex to program.

SUMMARY

The object of the invention is to provide a method of the type described above, with which the production and operation of a website is easier, and particularly quicker.

The object is achieved according to the invention in that a line of code is integrated on the website to be created or operated, or, in virtual scenarios, for example in VR goggles, is virtually instantiated therein, by means of which a connection to an evaluation unit of a data processing system can be established if an area of the graphical user interface has been selected by the operating pointer, which evaluation unit evaluates the selected area in terms of which action or representation or which process is likely to be triggered by the selected area. The evaluation can be carried out by means of artificial intelligence or an image or similarity analysis of the given image section in order to enable recognizing the functionality shown only visually on the website, so that the desired functionality is triggered.

This makes it easy to set up a website—for example, an online shop. The web designer only has to design the structure of the graphical user interface and integrate the single line of code or link it to the website. The website thus immediately receives the desired functionality without requiring special technical knowledge from the designer, since no code functionalities need to be implemented.

It is known that, for example, a search term can be entered in the area of a depicted search line if the operating pointer points to this search line and, if necessary, has activated it by "clicking". This functionality is provided by a code that has been specifically stored and assigned to the search line shown. In the case of a depicted control panel, for example, the "scroll" function is made available because this function is accessed by the stored code when the operating pointer swipes over this control panel on the graphical user interface. However, this functionality must have been specified beforehand.

The invention now provides that, in an intermediate step, the image content which has been selected by the operating pointer and is in the area around the operating pointer is perceived, and the function the user expects for the same is interpreted. The evaluation unit can thus recognize, for example, that there is a search bar or an input line in the selected area on the display device, which is also identified as such by the image or similarity analysis. Corresponding search functionalities or input functionalities can then be triggered. It is therefore no longer necessary to connect a predetermined area with a predetermined functionality beforehand. Rather, the function that is merely depicted, and not actually stored, is only instantiated and triggered by the method according to the invention.

It is therefore no longer necessary to configure the selectable fields with functionality in advance. However, it is useful if the field or area is marked as activatable or selectable. The selected area is transmitted via the line of code to the evaluation unit, which determines the activity to be carried out on the basis of the image content or text content, and triggers the relevant activity. The invention thus describes a new possibility of completely separating the design of web presentations from the technical implementation of the functionality represented by these presentations.

The design of a website alone enables the functional result to be achieved immediately, without a link structure that needs to be stored. The invention makes it possible for the given selection of a field or an area of the user interface to undergo an interpretation, and for the function that has been determined and shown to be subsequently triggered. Utilizing artificial intelligence and the image processing that is possible today, the system described can analyze and interpret the image areas selected by the operating pointer in such a way that the results or actions expected by the user are delivered. In particular, the web designer does not have to worry about this functionality. Rather, he only determines the desired functionality by choosing the design and the images used. The evaluation takes place in the data processing system, spatially separated from the data processing device, regardless of the selected design and the selected images. The advantage is that almost all of the human work required to create a technically functioning and designed GUI (graphical user interface) is eliminated.

It is only designed graphically—not programmed. The method is thus arranged between the purely visual representation of a website and the functionalities that are shown or symbolized on the website. Only modules are programmed, whose functionality will later be triggered by the similarity analysis and interpretation of the selected image content.

This results in significant time savings in the implementation of projects, and also the advantages that the designer can be spared from having any technical understanding and the programmers can be spared most of the design work. It is also possible to use a designed website universally on all platforms, shop systems, blog software and virtual platforms.

Image areas that are in the vicinity of a mouse click or another operating pointer, or areas that are selected by the user, for example by looks or gestures, are analyzed utilizing AI (Artificial Intelligence). The selectable areas can be marked as such in advance and, for this purpose, for example, their appearance changes recognizably when the operating pointer passes over them. Alternatively, the operating pointer can change its appearance when it passes over them.

The subsequent analysis of the transmitted area is evaluated according to the probability of validity, and the correct products, goods, information, images, processes, data, pieces of music, texts or other results are then displayed, played back or carried out. If the user selects a product in an image, for example with a click of the mouse, or if the user selects goods in sub-areas of an image, a result is displayed to him from an available population—for example the source of supply for the selected product. This was found completely without a link structure, since the expected reaction is determined first in the evaluation unit. The process necessary for this, for example accessing the website of the provider of the selected goods, is then carried out in the data processing system and is sent as a result to the data processing device of the user.

This analysis of the images and the finding of goods only on the basis of images are known from DE 10 2016 124 277 A1. However, the invention takes a different approach and enables the data processing system to interpret every image element that is located in the designed templates. It is recognized that a user has selected a design element of the graphical user interface that has to trigger certain processes. This includes, for example, a search line or menu item symbols.

Furthermore, the interpretation of category fields and their labeling is possible. It is also possible to interpret text, and to recognize logos, the selection of which, without a link, nevertheless leads to the website in question and in particular to the desired online shop with which the corresponding goods or services are offered. The interpretation of faces or gestures is also made possible. In particular, recognized gestures of a person can lead to the action associated therewith being carried out. For example, a program for recording and/or playing sounds, music or speech can be opened when a person puts his hand behind his ear, or a menu for changing the audio settings of a device can appear. If a person or a face is recognized, background information about this person, for example their contact details, can be shown or displayed.

All processes are triggered individually and do not require any computationally intensive preparatory work or the provision of analysis results that would have to map all possible fragments of the templates. It is no longer necessary to create link structure trees; rather, specific functionalities are triggered.

This functionality is implemented solely by the single, integrated line of code that has to be inserted into the design template or image, and via which the evaluation unit is accessed. When templates, designs or real-time images or virtual environments in VR goggles (virtual reality goggles) are displayed, this line of code is not found in the image; rather, it is instantiated in the corresponding device of the goggles.

This line of code finds the image content on the page; a selectable image can be defined by fields on the graphical user interface. An image, sub-area of the image, films, the entire template, sub-areas of the template, a graphic, text, one or more logos, writing, button symbols or image content may be present, and are analyzed and interpreted. These are preferably selected on the basis of the mouse or operator pointer position, a magnifying glass function, or a region definition of the images by the user. The image contents are transmitted for analysis to the data processing system designed as a server, which performs the evaluation and delivers meaningful and expected results. A designer is no longer dependent on the programmer. Accordingly, only on the server are the image contents recognized and the technical processes made available, wherein the same can be developed separately from the design of the GUI.

It is therefore provided according to the invention that after the evaluation of the selected area of the graphical user interface, the relevant action, the depiction, or the relevant process is carried out and displayed on the data processing device of the user. The relevant action, the depiction, or the relevant process are carried out with the data processing system or the data processing device.

To create the website, a template or the graphical user interface is first created with the line of code on the website without the graphical user interface being provided with the selectable areas. However, it is also possible that the graphical user interface is first created on the website without selectable areas, and then the line of code is integrated. In this case, it is also possible to retrofit existing and designed websites with the line of code to generate the desired functionality of the individual areas.

The advantage of the invention is particularly clear in this case. The functionality or functionalities are already available regardless of the design of the website. The line of code establishes a connection with the evaluation unit of the data processing system, and the selected area is transmitted. This is where the further processing takes place—in particular, the interpretation of the selected image content. The designer is therefore completely free to design a website and only needs to integrate the line of code before or afterwards in order to create a fully functional website.

It can be provided that the graphical user interface is divided into areas that can be selected by the operating pointer. As a result, the locations of the selectable areas are determined in order to more easily trigger the similarity analyses and interpretations of the represented symbolic content, and find the same. This also ensures that the entire image content of the selected area is transmitted for interpretation. This prevents faulty interpretations.

In any case, it is helpful if the line of code contains an identification code by which the owner and/or the operator of the website can be identified. This enables later billing (so-called sub-affiliation).

It is generally expedient if the images to be displayed on the graphical user interface are selected from an image gallery of the data processing system. This has the advantage that, in the case of a website with a search function, the selected image and the associated information are found identically. This is often expected as the first result by the website user.

It is of course also possible that other similar products are displayed, in addition to the identical selected product. The user is not only shown the product he wants, but also alternatives.

In principle, the images to be displayed on the graphical user interface can be freely selected. The evaluation unit then carries out a similarity analysis of the image in order to find the goods shown on it identically, equally, or similarly. Then as well, the user receives a satisfactory result.

BRIEF DESCRIPTION OF THE DRAWINGS

The invention will be explained in more detail below with reference to the schematic drawings.

FIG. 1 shows a data processing device of a user according to an embodiment;

FIG. 2 shows a data processing system, such as a server, to which the data processing device of FIG. 1 can connect via the Internet according to an embodiment; and FIG. 3 shows the data processing device of FIG. 1 displaying a different image than that displayed in FIG. 1.

DETAILED DESCRIPTION OF ILLUSTRATIVE EMBODIMENTS

In the drawing, a data processing device 11 of the user is shown on the left. In the middle is the spatially separated data processing system 12, which is connected to the data processing device via the World Wide Web (internet). The same data processing device 11 of the user is shown on the right-hand side, but with a different image on its display device 13, 13'.

The display device 13 comprises a graphical user interface which is to be designed by a web designer. The latter designs a website with a header A, which shows, for example, the operator's logo or brand. Below this is an input line B in which search terms can be entered manually. There are also image fields C-H in which images of various objects or the like are depicted. Below is a text block I in which other categories are displayed using text. Finally, there is a footer L with the necessary legal information and contact details. Such a structure of a website is known, and therefore requires no further explanation.

On this website, however, not only will images be displayed, but also actions will be carried out when selected by the user, by clicking on the operating pointer 14—for example, a mouse pointer. If the website is an online shop, items C-H, which can be purchased, are shown in the image fields. By clicking on the corresponding image of a product, the user expects the display of further information regarding the goods shown—for example, the price, the size, and the source of supply. An order form can also be displayed.

It is also possible that, after selecting an image C-H, the user would like to see other similar goods in the same category, or may expect certain processes—for example, the display of a registration form. However, this requires the selectable field to be linked to the relevant functionality. This link must be established and created by the web designer or by a programmer using corresponding, stored links. This is relatively time-consuming, and is eliminated by the invention.

In the method shown in the drawing, it is therefore provided that a line of code 15 is integrated into the website, which is not necessarily visible on the display device 13.

This line of code connects the data processing device 11 to the data processing system 12, which is designed as a server. A connection to an evaluation unit 16 is established by this line of code 15 or by the connection program triggered thereby, and by means of this connection, the position of the operating pointer 14 on the display device 13 is detected and evaluated. The operating pointer points, for example, to the field D, and the position thereof allows the image contained therein to be transmitted to the evaluation unit 16. The operating pointer 14 can also be on the input line B, which is thus transmitted to the evaluation unit 16.

In general, it does not matter where the pointer is. Specific fields for images or input lines can be defined, such that, when a field is selected, the entire image content or the entire input line is always transmitted. However, it is also possible for the visual content around the operating pointer to be transmitted to the evaluation unit 16. For this purpose, an area around the operating pointer 14 can be defined.

The evaluation unit 16 is able, utilizing an interpretation unit, to recognize the image content of the transmitted area and to determine an expected action which will be triggered. If, for example, a specific item is selected by the operating pointer 14, as is depicted in the field D, the evaluation unit will recognize this and access the further information about this item from a memory 18, and display it on a new screen page 13' of the data processing device 11 of the user.

If an abstract product is displayed in the selected field D, this is interpreted by the evaluation unit 16 in such a way that similar products are to be searched for and displayed. The evaluation unit 16 therefore accesses a search engine 19 which searches for the same and similar goods on the basis of the selected image in the field D, and then displays it/them on a new screen page 13' of the data processing device 11 of the user.

If the image in field D symbolizes a process that is to be carried out after the selection, this is also recognized by the evaluation unit 16, and the corresponding process module 20 is accessed. The steps which are then required—for example, a registration process or a payment process—are displayed on a new screen page 13' of the data processing device 11 with corresponding input options.

Also, the selection of the image in field D can also simply establish a connection to another website. For this purpose, the evaluation unit 16 recognizes the image content of the field D as a corresponding forwarding command, and retrieves the corresponding web address from an address memory 21, and displays the website in question on the new screen page 13' of the data processing device 11.

If, for example, the input field B is selected with the operating pointer 14, the corresponding image section is transmitted to the evaluation unit 16. The latter recognizes—for example, from the shape of the field B as an elongated bar with the height of a letter, or from a symbol shown in the field B—that it is an input field, and accesses the corresponding input process, which is then shown on the new screen page 13' of the data processing device 11. The text entered in this way can then be edited.

The content of the selected image area can be interpreted in the context of the entire website. This enables the search for certain goods or services to be made in an even more targeted and accurate manner.

These examples make it clear that the web designer really only has to design the appearance of the website. The stored functionality is produced by the evaluation unit, which evaluates the selected image content and carries out the detected and expected functionality. These processes are possible without a link structure and are ultimately based on the visual evaluation and interpretation of the section of the graphical user interface of the display device 13 that is transmitted and selected by the line of code.

It is of course possible for the web designer to define certain areas on the graphical user interface as selectable in advance. Then, for example, it is possible to search only for certain displayed goods, or only for goods of a certain brand. The latter is made possible by the evaluation unit—for example, on the basis of a detectable and recognizable logo. However, any image can be set; its content is then segmented and evaluated, for example. The process unit 20 then, for example, first generates an image of the objects found in the relevant image. The user can then make a selection, and can quickly see his desired goods, and can buy, rent or borrow them, for example.

The line of code contains, on the one hand, the script for the connection of the data processing device 11 to the data processing system 12. In addition, the line of code 15 can contain the identification of the user or the operator of the website, so that later billing is possible. Via the connection set up in this way, the selected image content, which may also contain text or be embodied by the same, is transmitted to the evaluation unit 16 of the data processing system 12.

A further advantage can be seen in the fact that the image evaluation of the selected area always finds and displays current websites, or only current goods, regardless of the age of the initial website displayed on the data processing device 11. Accordingly, the website always remains up to date, since, for example, a selected search process triggered by the evaluation unit 16 always finds only active websites that are up to date. This accordingly prevent a futile search for goods that are no longer available.

What is claimed is:

1. A method for creating a website, the method comprising:
    creating the website comprising at least one image displayable in a graphical user interface of a display of a data processing device, wherein the at least one image is otherwise without any programmed function related to a visual image content of the at least one image; and
    integrating a single line code with the website, wherein the line code is able to transmit a selectable visual image content of the at least one image to an evaluation unit of a data processing system such that, when the at least one image is displayed in the graphical user interface on the data processing device and an area of the at least one image is selected by an operating pointer of the data processing device, the selected visual image content of the area surrounding the operating pointer is transmitted to the evaluation unit for interpreting the selected visual image content and for determining, solely based on an interpretation of the visual image content, a relevant action, relevant representation, or relevant process is carried out by the data processing system or the data processing device and a result thereof is displayed on the graphical user interface of the data processing device.

2. The method of claim 1, wherein the at least one image is first created on the website and then the line code is integrated.

3. The method of claim 1, wherein the line code is first integrated into the website and then the at least one image is created on the website.

4. The method of claim 1, wherein the line code includes a script for a connection of the data processing device with the data processing system.

5. The method of claim 4, wherein the line code further includes an identification of a user and an identification of an operator.

6. The method of claim 1, wherein the at least one image comprises a plurality of images, each depicting a product.

7. The method of claim 6, wherein the result to be displayed is similar products.

8. The method of claim 1, wherein the at least one image to be displayed in the graphical user interface is selectable from an image gallery.

9. The method of claim 1, wherein the operating pointer is a mouse arrow.

10. The method of claim 1, wherein the operating pointer is embodied by user's eye's focus.

11. The method of claim 1, wherein the selected visual image content is interpreted in context of an entire website.

12. The method of claim 1, wherein the operating pointer is a finger of a user or a stylus.

13. A method for creating a website, the method comprising:
   creating the website comprising at least two images displayable in a graphical user interface of a display of a data processing device, wherein the at least two images are otherwise without any programmed function related to a visual image content of the at least two images; and
   integrating a single line code with the website, wherein the line code is able to transmit a selectable visual image content of the at least two images to an evaluation unit of a data processing system such that, when the at least two images are displayed in the graphical user interface on the data processing device and an area of at least one image of the two images is selected by an operating pointer of the data processing device, the selected visual image content of the area surrounding the operating pointer is transmitted to the evaluation unit for interpreting the selected visual image content and for determining, solely based on an interpretation of the visual image content, a relevant action, relevant representation, or relevant process is carried out by the data processing system or the data processing device and a result thereof is displayed on the graphical user interface of the data processing device.

14. The method of claim 13, wherein the at least two images are first created on the website and then the line code is integrated.

15. The method of claim 13, wherein the line code is first integrated into the website and then the at least two images are created on the website.

16. The method of claim 13, wherein the line code includes a script for a connection of the data processing device with the data processing system.

17. The method of claim 16, wherein the line code further includes an identification of a user and an identification of an operator.

18. The method of claim 13, wherein the at least two images depict products.

19. A method for creating a website, the method comprising:
   creating the website representing a single image, wherein the website does not contain any programmed functions other than an appearance of such an image; and
   integrating a single line code with the website, wherein the line code is able to transmit a selectable visual image content of the image to an evaluation unit of a data processing system such that, when the image is displayed in a graphical user interface on the data processing device and an area of the image is selected by an operating pointer of the data processing device, the selected visual image content of the area surrounding the operating pointer is transmitted to the evaluation unit for interpreting the selected visual image content and for determining, solely based on an interpretation of the selected visual image content, a relevant action, relevant representation, or relevant process is carried out by the data processing system or the data processing device and a result thereof is displayed on the graphical user interface of the data processing device.

* * * * *